(12) United States Patent
Mitsumoto

(10) Patent No.: US 10,059,240 B2
(45) Date of Patent: Aug. 28, 2018

(54) VEHICLE SEAT

(71) Applicant: TACHI-S CO., LTD., Akishima-shi, Tokyo (JP)

(72) Inventor: Toshinari Mitsumoto, Tokyo (JP)

(73) Assignee: TACHI-S CO., LTD., Tokyo (JP)

( * ) Notice: Subject to any disclaimer, the term of this patent is extended or adjusted under 35 U.S.C. 154(b) by 0 days.

(21) Appl. No.: 15/653,514

(22) Filed: Jul. 18, 2017

(65) Prior Publication Data

US 2018/0056828 A1  Mar. 1, 2018

(30) Foreign Application Priority Data

Aug. 23, 2016 (JP) .................................. 2016-162776

(51) Int. Cl.
*B60N 2/58* (2006.01)
*B60N 2/90* (2018.01)
*B60N 2/44* (2006.01)
*B60N 2/16* (2006.01)
*B60N 2/20* (2006.01)

(52) U.S. Cl.
CPC ........... *B60N 2/933* (2018.02); *B60N 2/4435* (2013.01); *B60N 2/58* (2013.01); *B60N 2/16* (2013.01); *B60N 2/20* (2013.01)

(58) Field of Classification Search
CPC ......... B60N 2/933; B60N 2/58; B60N 2/4435

USPC ....................................................... 297/463.1
See application file for complete search history.

(56) References Cited

U.S. PATENT DOCUMENTS

| 7,938,490 B2 * | 5/2011 | Ishijima | B60N 2/0296 297/463.1 |
| 7,959,229 B2 * | 6/2011 | Ishijima | B60N 2/0296 297/463.1 |
| 9,022,477 B2 * | 5/2015 | Pleskot | B60N 2/06 297/463.1 |
| 2015/0306983 A1 | 10/2015 | Takei et al. | |

FOREIGN PATENT DOCUMENTS

| JP | 2014-148215 A | 8/2014 |
| JP | 2016-022905 A | 2/2016 |

* cited by examiner

*Primary Examiner* — Anthony D Barfield
(74) *Attorney, Agent, or Firm* — Shapiro, Gabor and Rosenberger, PLLC

(57) ABSTRACT

A vehicle seat includes: a side cover; a first operation lever placed on a lateral side of the side cover; and a second operation lever placed closer to the side cover than the first operation lever is placed. The side cover includes: a first abut boss; and a second abut boss placed closer to a rotation center of the second operation lever than the first abut boss is placed. The second operation lever includes: a first abut rib; a second abut rib placed closer to a rotation center of the second operation lever than the first abut rib is placed; and a third abut rib placed closer to the rotation center of the second operation lever than the first abut rib is placed.

11 Claims, 10 Drawing Sheets

F I G . 4
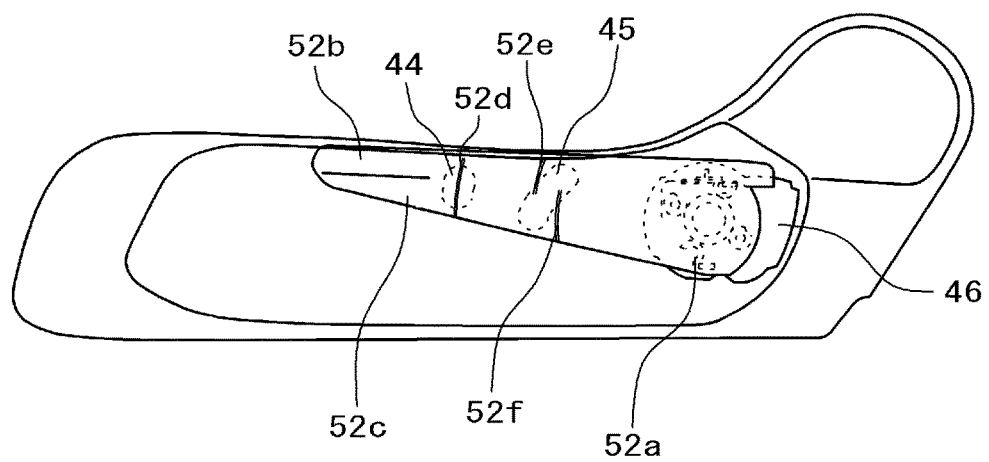

VEHICLE SEAT

CLAIM OF PRIORITY

The present application claims priority from Japanese patent application JP2016-162776 filed on Aug. 23, 2016, the content of which is hereby incorporated by reference into this application.

BACKGROUND

This disclosure relates to a vehicle seat, which is applicable to, for example, a vehicle seat with a lifter operation lever.

Some vehicle seats includes a height device (lifter) that couples a seat cushion which is a seating portion of a seat body to the vehicle-body floor such that the seat cushion is movable upward/downward relative to the vehicle-body floor. In most cases, the height device is mounted between the seat cushion and the vehicle-body floor, and includes a pair of front links on the front side of the seat and a pair of rear links on the rear side of the seat. The height device is configured to be able to adjust the height of the seat body with one of the rear links acting as a drive link. Further, an operation lever is mounted to the outside of the drive link in the seat-width direction to control the drive of the height device with a side cover being placed between the drive link and the operation lever.

SUMMARY

In order to aid in smooth operation when the operation lever placed on the side of the side cover is operated and to reduce the backlash in the width direction, a rib is formed in the side cover to be placed into contact with or adjacent to the operation lever. However, if the length of the operation lever is increased while the leading end of the operation lever is facing the side cover, the leading end of the operation lever may come into contact with the side cover.

It is an object of the disclosure to provide a vehicle seat having an operation lever with reduced backlash.

Other provides and new features will be apparent from the description of the specification and the accompanying drawings.

The following is a brief overview of representative one of embodiments of the disclosure.

Specifically, a vehicle seat includes: a side cover; a first operation lever which is placed on a lateral side of the side cover; and a second operation lever which is placed closer to the side cover than the first operation lever is placed. The side cover includes: a first abut boss; and a second abut boss which is placed closer to a rotation center of the second operation lever than the first abut boss is placed. The second operation lever includes: a first abut rib; a second abut rib which is placed closer to a rotation center of the second operation lever than the first abut rib is placed; and a third abut rib which is placed closer to the rotation center of the second operation lever than the first abut rib is placed.

With the above vehicle seat, a reduction in backlash in an operation lever can be achieved.

BRIEF DESCRIPTION OF THE DRAWINGS

FIG. 4 is a side view of the side cover and the second operation in FIG. 1;

DESCRIPTION OF THE PREFERRED EMBODIMENTS

Figure 1:
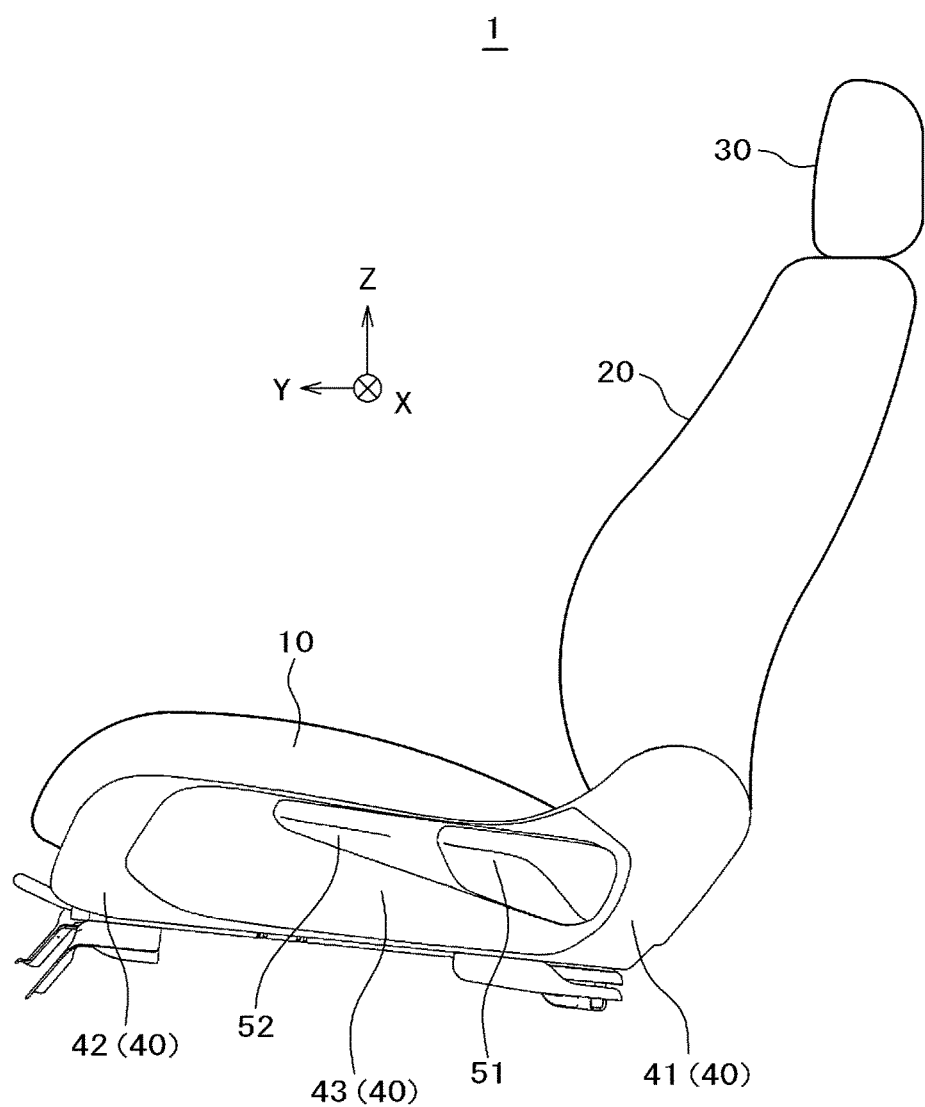
FIG. 1 is a side view of a vehicle seat in accordance with an embodiment of the present invention.

Embodiments and modifications will now be described with reference to the accompanying drawings. In the following description, like reference signs refer to like components and a duplicate description is omitted in some cases. In the drawings, for a more clear description, each element is sometimes shown schematically with a different width, thickness, shape and/or the like as compared with an actual mode, which is merely illustrative and is not therefore to be considered to be limiting of interpretation of this invention. Moreover, numbers representing dimensions, angles and the like are illustrative and are not limiting. Regarding directions used herein such as front and rear directions, up and down directions, left and right directions and the like, the Y-axis positive direction shown in FIG. 1 is defined as a forward direction, the X-axis positive direction is defined as a rightward direction and the Z-axis positive direction is defined as an upward direction.

Embodiment

First, the structure of a vehicle seat in accordance with an embodiment will be described with reference to FIG. 1. FIG. 1 is a side view illustrating a vehicle seat in accordance with an embodiment.

The vehicle seat 1 in accordance with the embodiment includes a vertical-movable seat cushion 10, a seatback 20 which is tiltable relative to the seat cushion 10, a headrest 30 connected to the seatback 20, and a side cover 40.

The side cover 40 covers the side of a rear portion of the seat cushion 10 from the lateral side of a front portion of the seat cushion 10 and also covers the side of a lower portion of the seatback 20 from the lateral side of the seatback 20. The side cover 40 also covers a reclining mechanism and a lifter mechanism which are not shown. The side cover 40 is a resin molded article, which has protrusions 41, 42 and a recessed portion 43. The protrusions 41, 42 bulge laterally (outward) on the lateral side of a rear portion and the lateral side of a front portion of the side cover 40, respectively. The recessed portion 43 is bowed inward between the protrusions 41, 42.

In the recessed portion 43 of the side cover 40, a first operation lever 51 and a second operation lever 52 are provided to be grasped by the operator. More specifically, the first operation lever 51 is a reclining operation lever used to adjust the tilt of the seatback 20, and the second operation lever 52 is a lifter operation lever used to adjust the height of the seat cushion 10. The first operation lever 51 is coupled to the reclining mechanism mounted to a frame. The second operation lever 52 is coupled to the lifter mechanism mounted to the frame. The first operation lever 51 and the second operation lever 52 are formed by use of resin. The first operation lever 51 is shorter in length than the second operation lever 52, and is located outward of the second operation lever 52. Thus, a grip of the first operation lever 51 and a grip of the second operation lever 52 are arranged in tandem, in which the grip of the first operation lever 51 is located rearward of the grip of the second operation lever 52.

Figure 2:
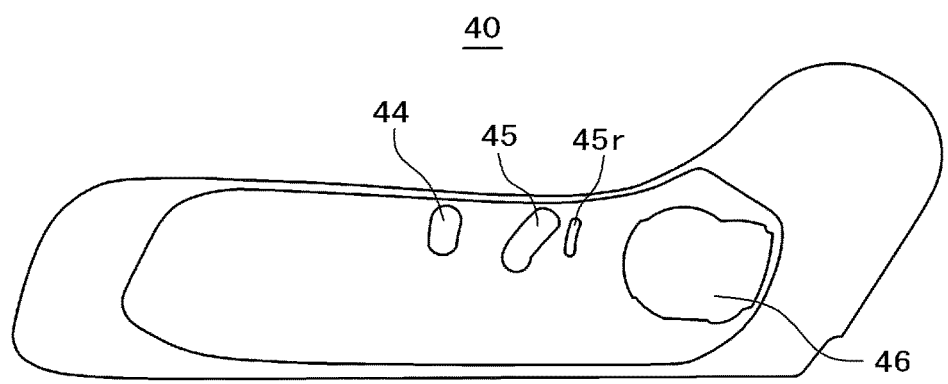
FIG. 2 is a side view of a side cover in FIG. 1.

The side cover will be described below with reference to FIG. 2. FIG. 2 is a side view of the side cover when viewed from outside. The side cover is attached to the vehicle with the front portion of the side cover being located in a slightly upper position in FIG. 1, but in FIG. 2 and later figures, the lower side of the side cover is described along the horizontal direction.

A plurality of abutting protuberant portions (protrusions) is formed on the side of the side cover 40. The abutting protuberant portions of the side cover are hereinafter referred to as "abutting bosses" or "bosses". Specifically, a first boss 44 and a second boss 45 are formed on the recessed portion 43 of the side cover 40.

The second boss 45 is located near a front portion of the grip of the first operation lever 51 which is forward of a through hole 46. The first boss 44 is located near a rear portion of the grip of the second operation lever 52 which is forward of the second boss 45. The first boss 44 and the second boss 45 are located away from each other in the front-rear direction, so that the second boss 45 is located between the first boss 44 and the through hole 46 in the front-rear direction. The first boss 44 is located in the vicinity of the center of the side cover 40. The distance between the second boss 45 and the through hole 46 is longer than the distance between the first boss 44 and the second boss 45.

The first boss 44 vertically extends along the circumference of a circle centered around the center of the through hole 46 (the rotation center of the second operation lever 52). The second boss 45 vertically extends to be slightly offset from the circumference of the circle centered around the center of the through hole 46. The first boss 44 is formed in an arc shape centered around the center of the through hole 46. Note that each of the first boss 44 and the second boss 45 has a width greater than a rib which will be described later.

The upper end of the second boss 45 is placed out of alignment with the upper end of the first boss 44 in the up-down direction, and the lower end of the second boss 45 is placed out of alignment with the lower end of the first boss 44 in the up-down direction. Specifically, the upper end of the second boss 45 is offset upward from the upper end of the first boss 44, and the lower end of the second boss 45 is offset upward from the lower end of the first boss 44. The first boss 44 is shorter in length than the second boss 45 in the up-down direction.

Note that FIG. 2 also shows a boss 45r of a side cover in accordance with the techniques studied prior to this application by the inventors of this application (hereinafter referred to as a "comparative example"), which is not included the side cover in accordance with the embodiment. The side cover in accordance with the comparative example has only one boss 45r. The boss 45r is situated on the through hole 46 side of the second boss 45.

Figure 3:
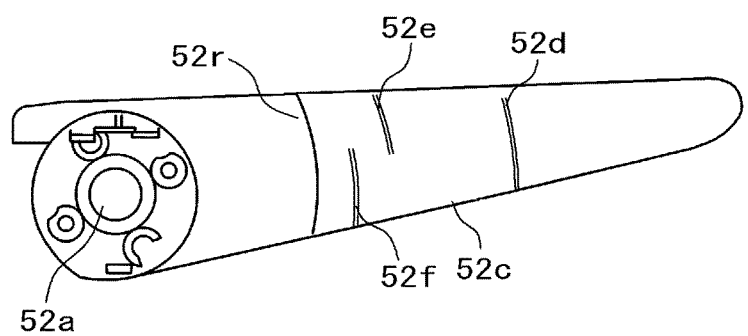
FIG. 3 is a side view of a second operation lever in FIG. 1 when viewed from inside.

The second operation lever (lifter operation lever) will be described below with reference to FIG. 3. FIG. 3 is a side view of the second operation lever when viewed from inside (inner side).

The second operation lever 52 has a mounting portion 52a, the grip 52b, an arm 52c and the like. The mounting portion 52a is a part serving as a rotation shaft of the second operation lever 52, and the mounting portion 52a is mounted to a power transmission unit (not shown) of the lifter mechanism. The grip 52b is a part grasped by the operator. The arm 52c extends from the mounting portion 52a to the grip 52b. The grip 52b and the mounting portion 52a are coupled by the arm 52c. The second operation lever 52 is made of resin, in which the mounting portion 52a, the grip 52b and the arm 52c are molded of resin in one piece. The second operation lever 52 is formed in a plate shape, which has an upper side extending forward from near an upper portion of the mounting portion 52a and a lower side extending forward from near a lower portion of the mounting portion 52 when viewed from side. The length between the upper side and lower side tapers down toward the front end, and the front end has a curve portion. The grip 52b protrudes forward from a front portion of the arm 52c.

A plurality of abutting protuberant portions (protrusions) is formed on the inner side of the second operation lever 52. The abutting protuberant portions of the second operation lever are hereinafter referred to as "abutting ribs" or "ribs". Specifically, a first rib 52d, a second rib 52e and a third rib 52f are formed on the inner side of the arm 52c of the second operation lever 52.

The third rib 52f is located near the second boss 45 of the side cover 40 which is forward of the mounting portion 52a. The second rib 52e is located near the second boss 45 which is forward of the third rib 52f. The first rib 52d is located near the first boss 44 of the side cover 40 which is forward of the second rib 52e. The second rib 52e and the third rib 52f are placed in proximity to each other and near the center between the center of the mounting portion 52a (the rotation center of the second operation lever 52) and the front end of the second operation lever 52. The first rib 52d is placed near the center between the third rib 52f and the front end of the second operation lever 52. The distance between the second rib 52e and the center of the mounting portion 52a is longer than the distance between the first rib 52d and the second rib 52e, and is approximately equal to the distance between the first rib 52d and the front end of the second operation lever 52.

The first rib 52d, the second rib 52e and the third rib 52f vertically extend along the circumference of a circle centered around the center of the mounting portion 52a (the rotation center of the second operation lever 52). The first rib 52d, the second rib 52e and the third rib 52f are formed in an arc shape centered around the center of the mounting portion 52a.

The upper end of the third rib 52f is placed out of alignment with the upper end of the second rib 52e in the up-down direction. The lower end of the third rib 52f is placed out of alignment with the lower end of the second rib 52e in the up-down direction. The third rib 52f and the second rib 52e are at least partially placed in different positions from each other in the up-down direction. Specifically, the upper end of the third rib 52f is offset downward from the upper end of the second rib 52e, and the lower end of the third rib 52f is offset downward from the lower end of the second rib 52e. The upper end of the third rib 52f is offset upward from the lower end of the second rib 52e, so that the third rib 52f and the second rib 52 overlap each other in a range from the upper end of the third rib 52f to the lower end of the second rib 52e in the up-down direction. The lower end of the third rib 52f is situated near the lower side of the arm 52c and the upper end of the second rib 52e is situated near the upper side of the arm 52c. The upper end of the first rib 52d is situated near the upper side of the arm 52c and the lower end of the first rib 52d is situated near the lower side of the arm 52c. The upper end of the third rib 52f may be offset upward from the lower end of the second rib 52e. Alternatively, the position of the upper end of the third rib 52f in the up-down direction may be aligned with the position of the lower end of the second rib 52e in the up-down direction. In these cases, the third rib 52f and the second rib 52e do not overlap each other, so that the third rib 52f and the second rib 52e are entirely placed different positions in the up-down direction.

FIG. 3 also shows a rib 52r of a second operation lever in accordance with a comparative example, but the second operation lever in accordance with the embodiment does not have the rib 52r. The second operation lever in accordance with the comparative example has only one rib 52r. The rib 52r is situated on the mounting portion 52a side of the third rib 52f. The upper end of the rib 52r is situated near the upper side of the arm 52c, and the lower end of the rib 52r is situated near the lower side of the arm 52c.

Figure 5:
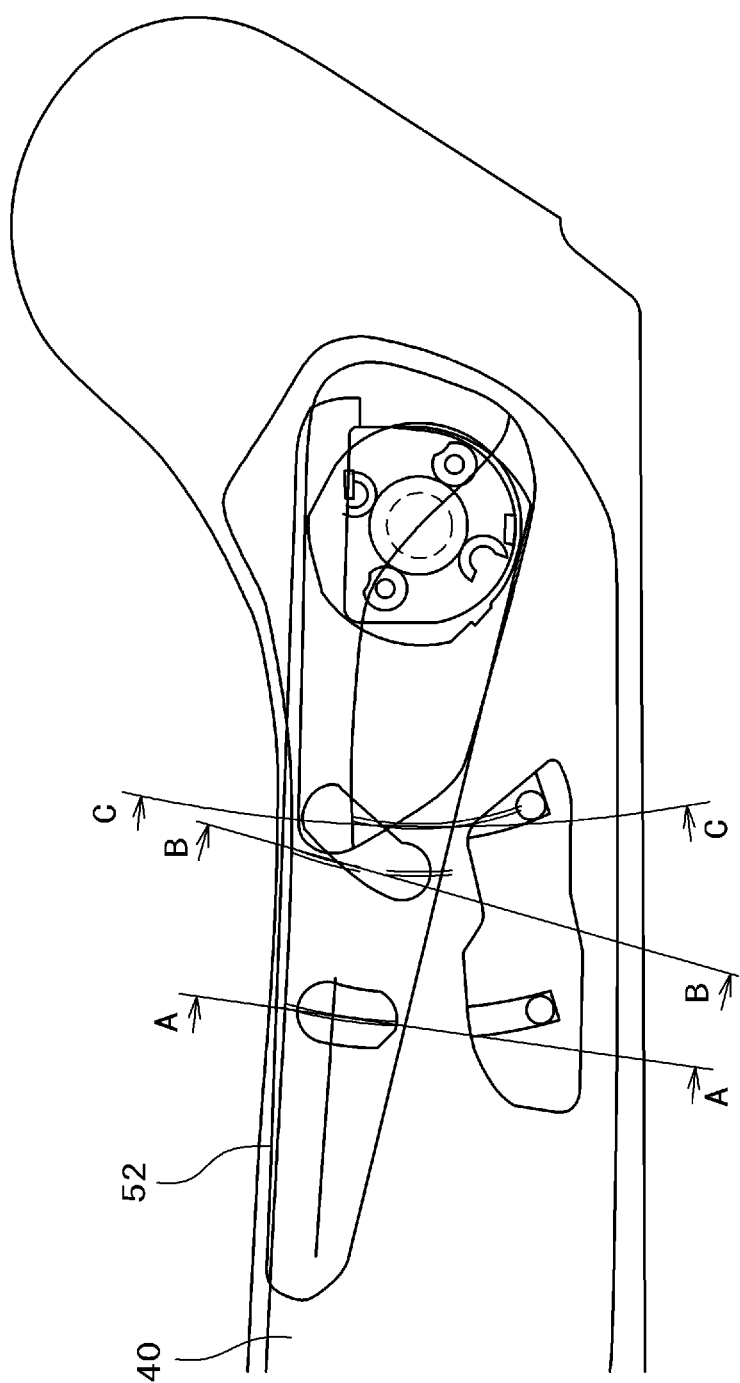
FIG. 5 is a transparent side view of the side cover and the second operation lever in FIG. 1.
Figure 6:
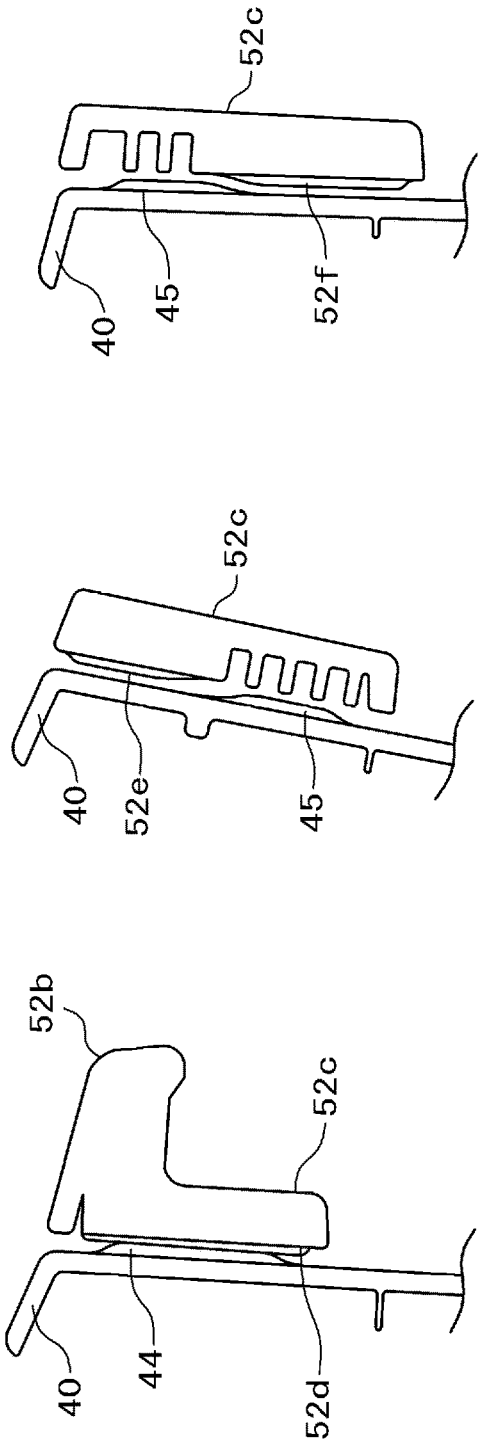
FIG. 6A is a sectional view taken along A-A line of FIG. 5.
FIG. 6B is a sectional view taken along B-B line of FIG. 5.
FIG. 6C is a sectional view taken along C-C line of FIG. 5.

The initial state in which the second operation lever is not operated will be described below with reference to FIG. 4 to FIG. 6. FIG. 4 is a side view of the side cover and the second operation lever in FIG. 1. FIG. 4 transparently shows the second operation lever. FIG. 5 is a transparent side view of the side cover and the second operation lever in FIG. 1. FIG. 6A is a sectional view taken along A-A line of FIG. 5. FIG. 6B is a sectional view taken along B-B line of FIG. 5. FIG. 6C is a sectional view taken along C-C line of FIG. 5.

In the initial state in which the second operation lever 52 is not operated, the arm 52c and the grip 52b are located on the lateral side of the side cover 40, in which the position of the second operation lever 52 is referred to as an "initial position". The arm 52c of the second operation lever 52 face the first boss 44 and the second boss 45, so that the arm 52c of the second operation lever 52 overlap the first boss 44 and the second boss 45 when the side cover 40 and the second operation lever 52 are viewed from side. When the second operation lever 52 is at its initial position, the first boss 44 and the second boss 45 are hidden behind the second operation lever 52.

As illustrated in FIG. 6A, the first rib 52d on the inner-side surface of the arm 52c abuts on the first boss 44. As illustrated in FIG. 6B, the second rib 52e is away from the second boss 45. As illustrated in FIG. 6C, the third rib 52f is away from the second boss 45. When the first rib 52d on the inner-side surface of the arm 52c abuts on the first boss 44, the inner-side surface of the arm 52 is away from the side of the side cover 40, so that a clearance exists between the inner-side surface of the arm 52c and the side of the side cover 40.

In the comparative example, the rib 52r always abuts on the boss 45r. In this case, because the abutting position is close to the mounting portion 52a, the front end of the second operation lever may come into contact with the side cover to make a sound or a scratch. However, in the embodiment, because the first rib 52d located closer to the front end of the second operation lever abuts on the first boss 44, the front end of the second operation lever is able to be restrained from making contact with the side cover.

In an example of specific dimensions in FIG. 5, a distance from the center of the mounting portion 52a (the rotation center of the second operation lever 52) to the third rib 52f is 100 mm; a distance from the center of the mounting portion 52a to the second rib 52e is 115 mm; and a distance from the center of the mounting portion 52a to the first rib 52d is 165 mm. In the comparative example, a distance from the center of the mounting portion to the rib 52r is 82.5 mm. The above-described dimensions are provided by way of example and the invention is not limited to these dimensions.

Figure 7:
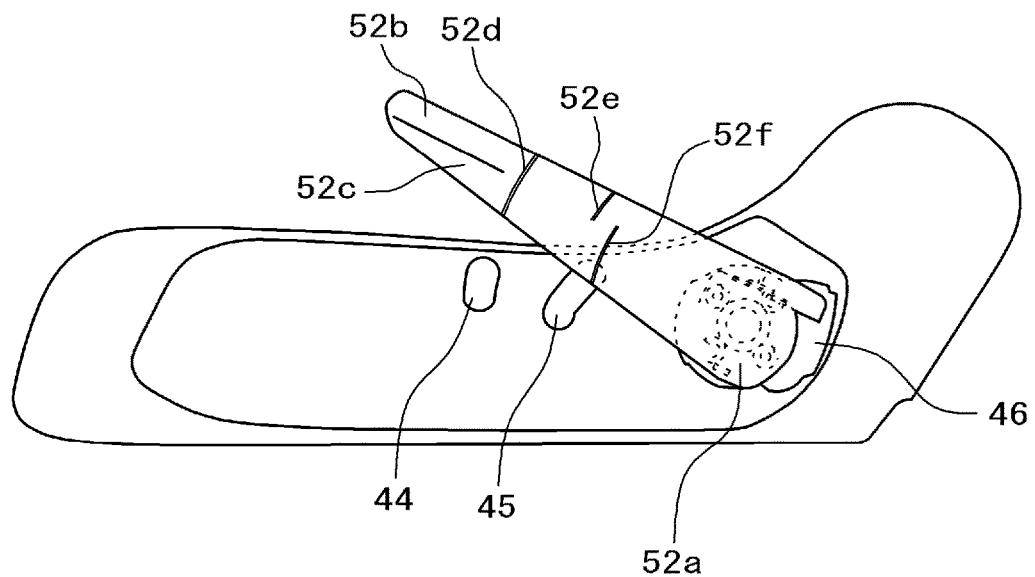
FIG. 7 is a side view of the side cover and the second operation lever in FIG. 1.

The state in which the second operation lever 52 is pulled up will be described below with reference to FIG. 7. FIG. 7 is a side view illustrating the side cover and the second operation lever in FIG. 1, in which the second operation lever pulled up to its highest position is illustrated.

As illustrated in FIG. 7, when the side cover 40 and the second operation lever 52 are viewed from side, even in the second operation lever 52 pulled up to its highest position, the second rib 52d of the arm 52c of the second operation lever 52 does not abut on the first boss 44 and the second rib 52e does not abut on the second boss 45, but the third rib 52f abuts on the second boss 45.

Figure 8:
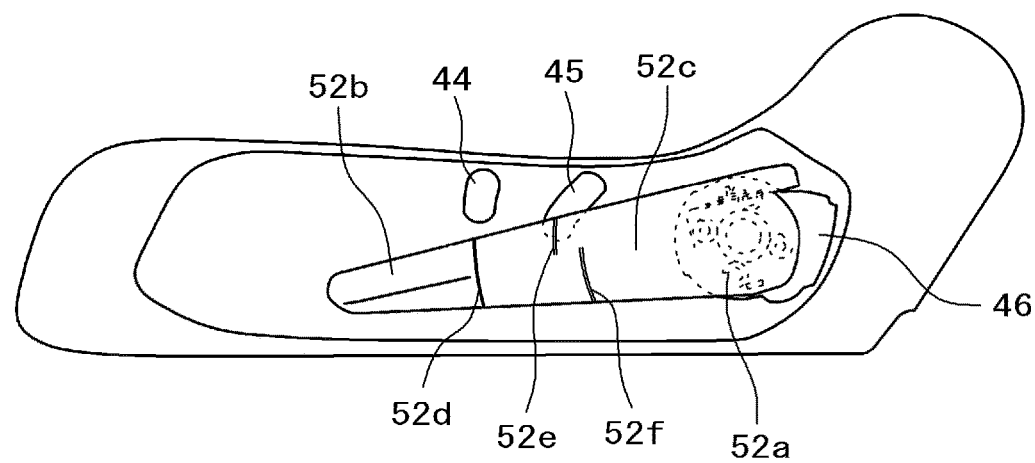
FIG. 8 is a side view of the side cover and the second operation lever in FIG. 1.

The state in which the second operation lever 52 is pulled down will be described below with reference to FIG. 8. FIG. 8 is a side view illustrating the side cover and the second operation lever in FIG. 1, in which the second operation lever pulled down to its lowest position is illustrated.

As illustrated in FIG. 8, when the side cover 40 and the second operation lever 52 are viewed from side, even in the second operation lever 52 pulled down to its lowest position, the second rib 52d of the arm 52c of the second operation lever 52 does not abut on the first boss 44 and the third rib 52f does not abut on the second boss 45, but the second rib 52e abuts on the second boss 45.

As long as the first rib 52d on the inner-side surface of the second operation lever 52 abuts on the first boss 44 or the second rib 52e or the third rib 52f abuts on the second boss 45, when the operator pulls the second operation lever 52 up/down as described above, the first rib 52d, the second rib 52e or the third rib 52f of the second operation lever 52 slides on the first boss 44 or the second boss 45.

Figure 9:
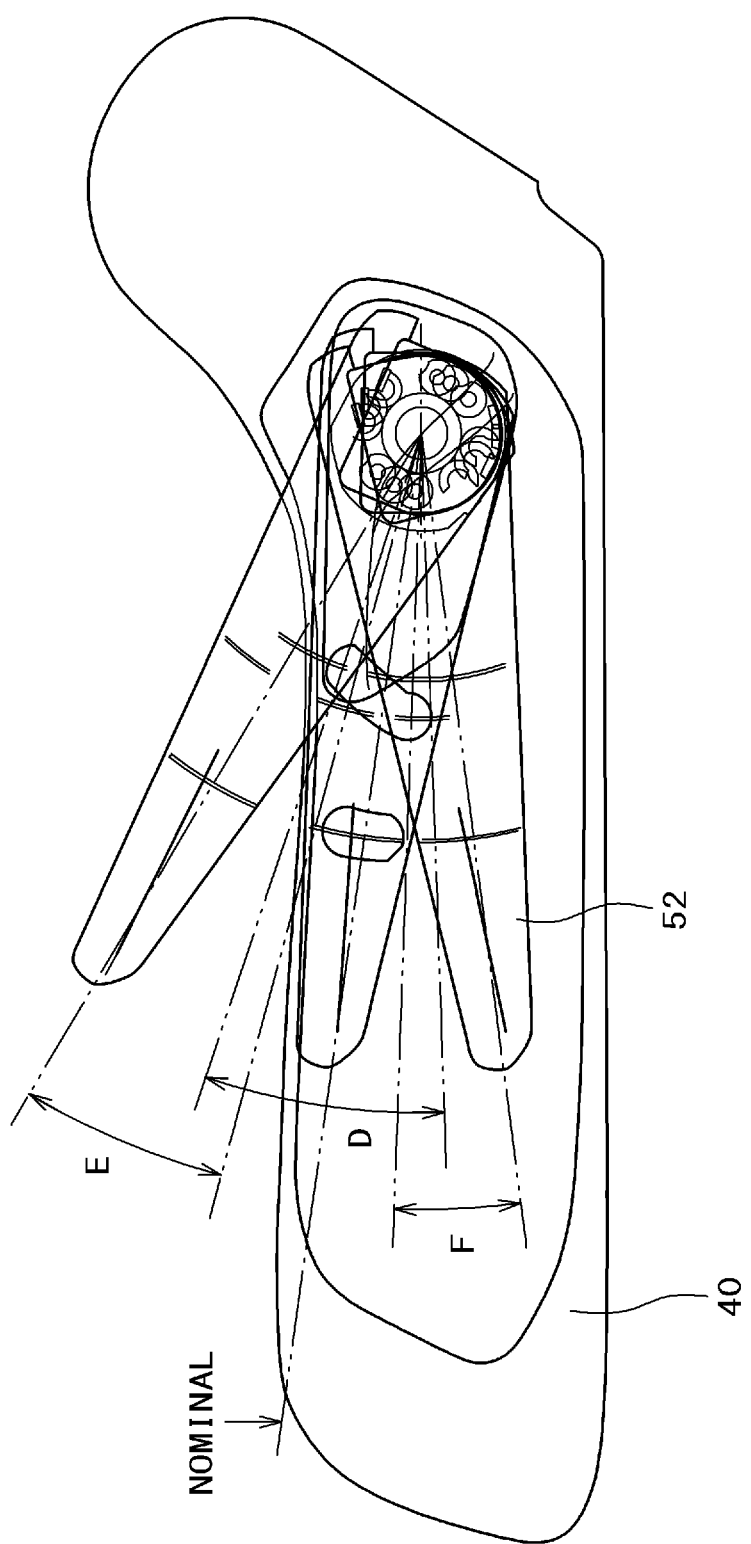
FIG. 9 is a side view of the side cover and the second operation lever in FIG. 1.

The operation range of the second operation lever being operated will be described below with reference to FIG. 9. FIG. 9 is a side view illustrating the side cover and the second operation lever in FIG. 1.

(1) A range (D in FIG. 9) that the first rib (forward rib) 52d abuts on the first boss 44 when the second operation lever 52 is operated is from 9 degrees at pull-up time to 10 degrees at pull-down time. These angles are determined with respect to the initial position (NOMINAL).

(2) A range (E in FIG. 9) that the third rib (rearward rib) 52f abuts on the second boss 45 when the second operation lever 52 is pulled up is from 6 degrees at the start of abutting to 23 degrees which is the maximum angle.

(3) A range (F in FIG. 9) that the second rib (rearward rib) 52e abuts on the second boss 45 when the second operation lever 52 is pulled down is from 6 degrees at the start of abutting to 16 degrees which is the maximum angle.

Accordingly, a range of switchover between the ribs abutting when the second operation lever 52 is operated (i.e., a range that the forward rib abuts on the first boss and the rearward rib abuts on the second boss) is from 3 degrees at pull-up time to 4 degrees at pull-down time.

In the embodiment, the forward rib (the first rib 52d) abuts on the forward boss (the first boss 44) and the rearward rib (the second rib 52e, the third rib 52f) abuts on the rearward boss (the second boss 45). The following is a description of modifications of the rearward rib or the rearward boss.

Modification 1

Figure 10:
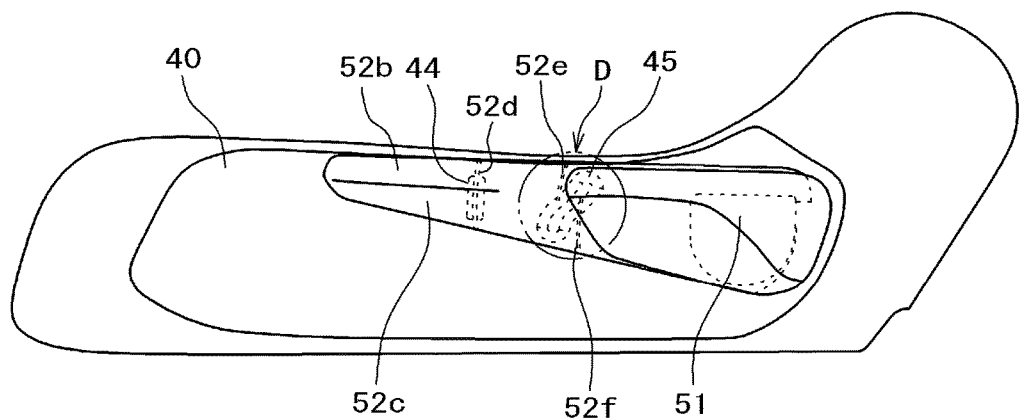
FIG. 10 is a side view of a side cover and a second operation lever in accordance with another embodiment.
Figure 11:
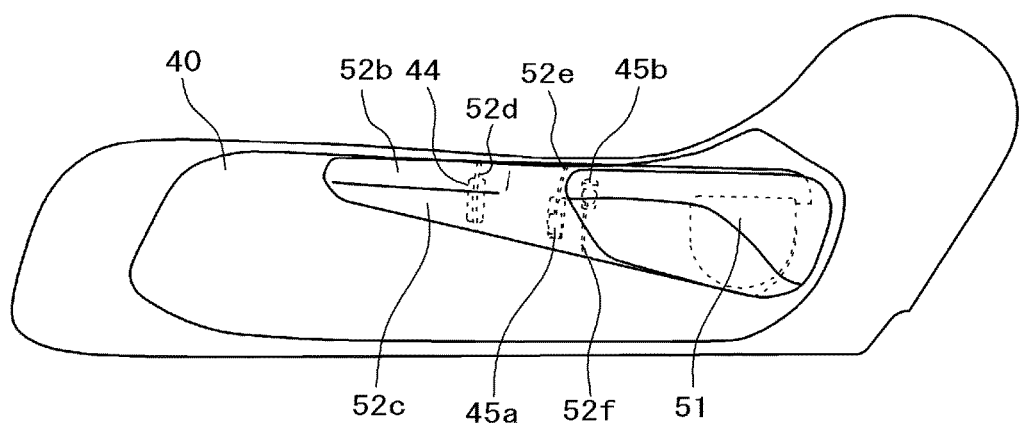
FIG. 11 is a side view of a side cover and a second operation lever in accordance with a modification 1.
Figure 12:
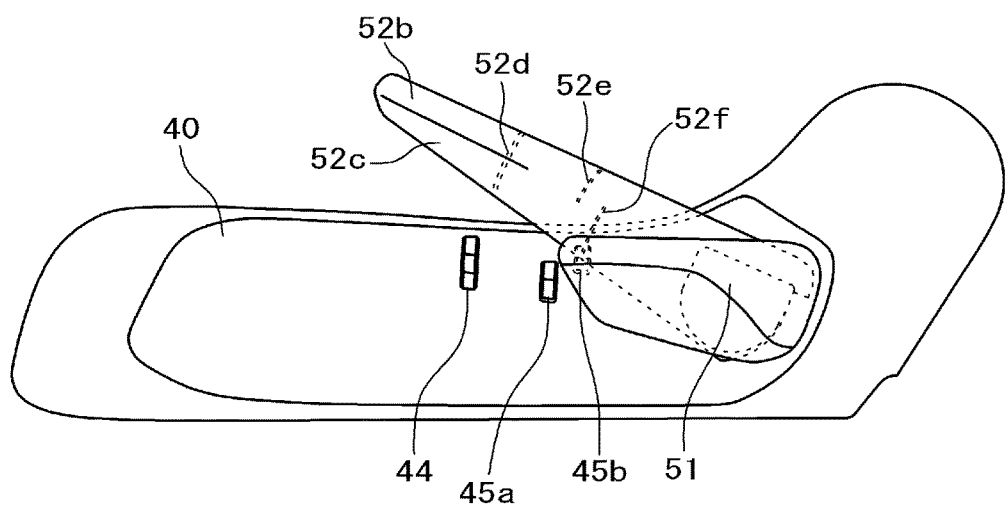
FIG. 12 is a side view of the side cover and the second operation lever in accordance with the modification 1.
Figure 13:
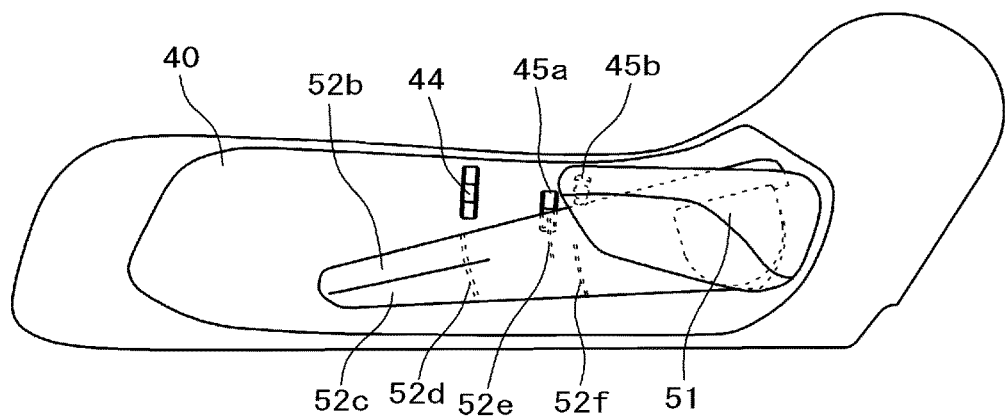
FIG. 13 is a side view of the side cover and the second operation lever in accordance with the modification 1.

A modification 1 includes the rearward boss made up of two bosses, which is described with reference to FIG. 10 to FIG. 13. FIG. 10 is a side view of the side cover, the first operation lever and the second operation lever in FIG. 1, in which the initial state of the second operation lever is illustrated. FIG. 11 is a side view of the side cover, the first operation lever and the second operation lever in accordance with the modification 1, in which the initial state of the second operation lever is illustrated. FIG. 12 is a side view of the side cover, the first operation lever and the second operation lever in accordance with the modification 1, in which the second operation lever pulled up to its heist position is illustrated. FIG. 13 is a side view of the side cover, the first operation lever and the second operation lever in accordance with the modification 1, in which the second operation lever pulled down to its lowest position is illustrated.

The rearward boss in the modification 1 differs from the rearward boss in the embodiment (corresponding to the area shown by a two-dot chain line D in FIG. 10), but the other components in the modification 1 are the same as those in the embodiment. The rearward boss is made up of a second boss 45a and a third boss 45b. The third boss 45b is located in front of the through hole 46 and the second boss 45a is located in front of the third boss 45b. The second boss 45a and the third boss 45b are located away from each other in the front-rear direction, and the second boss 45a is located between the first boss 44 and the through hole 46 in the front-rear direction.

The second boss 45a and the third boss 45b vertically extend along the circumference of a circle centered around the center of the through hole 46. The second boss 45a and the third boss 45b are formed in an arc shape centered around the center of the through hole 46. The second boss 45a and the third boss 45b have widths greater than those of the second rib 52e and the third rib 52f, respectively.

The upper end of the third boss 45b is placed out of alignment with the upper end of the second boss 45a in the up-down direction, and the lower end of the third boss 45b is placed out of alignment with the lower end of the second boss 45a in the up-down direction. The third boss 45b and the second boss 45a are at least partially placed in different positions from each other in the up-down direction. Specifically, the upper end of the third boss 45b is offset upward from the upper end of the second boss 45a, and the lower end of the third boss 45b is offset upward from the lower end of the second boss 45a. The lower end of the third boss 45b is offset downward from the upper end of the second boss 45a. Thus, the third boss 45b and the second boss 45a overlap each other in a range from the lower end of the third boss 45b to the upper end of the second boss 45a in the up-down direction. Each of the second boss 45a and the third boss 45b has a shorter length in the up-down direction than that of the first boss 44.

In the modification 1, the first rib 52d abuts on the first boss 44. The second rib 52e abuts on the second boss 45a. The third rib 52f abuts on the third boss 45b.

When the second operation lever 52 is at its initial position, the first rib 52d on the inner-side surface of the arm 52c abuts on the first boss 44 as in the case of FIG. 6A, the second rib 52e is away from the second boss 45a as in the case of FIG. 6B, and the third rib 52f is away from the third boss 45b as in the case of FIG. 6C. When the first rib 52d on the inner-side surface of the arm 52c abuts on the first boss 44, the inner-side surface of the arm 52c is away from the side of the side cover 40, so that a clearance exists between the inner-side surface of the arm 52c and the side of the side cover 40. When the second operation lever 52 is at its initial position, the first boss 44, the second boss 45a, and the third boss 45b are hidden behind the second operation lever 52.

As illustrated in FIG. 12, when the side cover 40 and the second operation lever 52 are viewed from side, even in the second operation lever 52 pulled up to its highest position, the first rib 52d of the arm 52c of the second operation lever 52 does not abut on the first boss 44 and the second rib 52e does not abut on the second boss 45a, but the third rib 52f abuts on the third boss 45b.

As illustrated in FIG. 13, when the side cover 40 and the second operation lever 52 are viewed from side, even in the second operation lever 52 pulled down to its lowest position, the first rib 52d of the arm 52c of the second operation lever 52 does not abut on the first boss 44 and the third rib 52f does not abut on the third boss 45b, but the second rib 52e abuts on the second boss 45a.

As long as the first rib 52d on the inner-side surface of the second operation lever 52 abuts on the first boss 44 or the second rib 52e abuts on the second boss 45a or the third rib 52f abuts on the third boss 45b, when the operator pulls up/down the second operation lever 52 as described above, the first rib 52d, the second rib 52e and the third rib 52f of the second operation lever 52 slide respectively on the first boss 44, the second boss 45a and the third boss 45b.

In the modification 1, there is also a range of switchover between the ribs abutting when the second operation lever 52 is operated (i.e., a range that the forward rib abuts on the first boss and the rearward rib abuts on the second boss or the third boss) as in the case of the embodiment.

Modification 2

Figure 14:
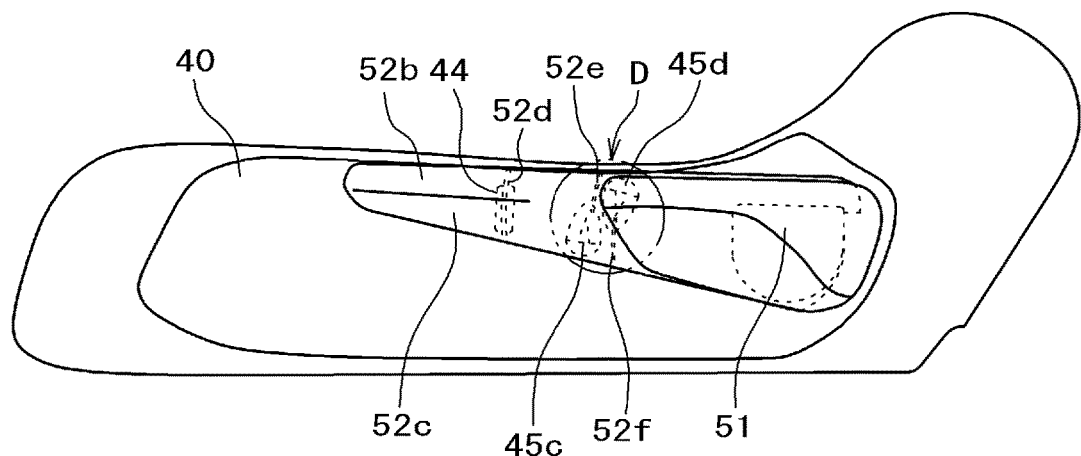
FIG. 14 is a side view of a side cover and a second operation lever in accordance with a modification 2.

A modification 2 includes the rearward boss made up of two bosses, which is described with reference to FIG. 14. FIG. 14 is a side view of the side cover, the first operation lever and the second operation lever in accordance with the modification 2, in which the initial state of the second operation lever is illustrated.

The rearward boss (corresponding to the area shown by a two-dot chain line D in FIG. 14) in the modification 2 differs from the rearward boss in the embodiment (corresponding to the area shown by a two-dot chain line D in FIG. 10), but the other components in the modification 2 are the same as those in the embodiment. For the rearward boss, the second boss in the embodiment is divided into two to form a second boss 45c and a third boss 45d. The second boss 45c and the third boss 45d may be completely separated from each other. Alternatively, a recess may be formed in the second boss 45 of the embodiment to achieve separation between the second boss 45c and the third boss 45d.

In the modification 2, the first rib 52d abuts on the first boss 44. The second rib 52e abuts on the second boss 45c. The third rib 52f abuts on the third boss 45d.

When the second operation lever 52 is at its initial position, the first rib 52d on the inner-side surface of the arm 52c abuts on the first boss 44 as in the case of FIG. 6A, the second rib 52e is away from the second boss 45c as in the case of FIG. 6B, and the third rib 52f is away from the third boss 45d as in the case of FIG. 6C. When the first rib 52d on the inner-side surface of the arm 52c abuts on the first boss 44, the inner-side surface of the arm 52c is away from the side of the side cover 40, so that a clearance exists between the inner-side surface of the arm 52c and the side of the side cover 40. When the second operation lever 52 is at its initial position, the first boss 44, the second boss 45c, and the third boss 45d are hidden behind the second operation lever 52.

As in the case of FIG. 12, when the side cover 40 and the second operation lever 52 are viewed from side, even in the second operation lever 52 pulled up to its highest position, the first rib 52d of the arm 52c of the second operation lever 52 does not abut on the first boss 44 and the second rib 52e does not abut on the second boss 45c, but the third rib 52f abuts on the third boss 45d.

As in the case of FIG. 13, when the side cover 40 and the second operation lever 52 are viewed from side, even in the second operation lever 52 pulled down to its lowest position, the first rib 52d of the arm 52c of the second operation lever 52 does not abut on the first boss 44 and the third rib 52f does not abut on the third boss 45d, but the second rib 52e abuts on the second boss 45c.

As long as the first rib 52d on the inner-side surface of the second operation lever 52 abuts on the first boss 44 or the second rib 52e abuts on the second boss 45c or the third rib 52f abuts on the third boss 45d, when the operator pulls up/down the second operation lever 52 as described above, the first rib 52d, the second rib 52e and the third rib 52f of the second operation lever 52 slide respectively on the first boss 44, the second boss 45c and the third boss 45d.

In the modification 2, there is also a range of switchover between the ribs abutting when the second operation lever 52 is operated (i.e., a range that the forward rib abuts on the first boss and the rearward rib abuts on the second boss or the third boss) as in the case of the embodiment.

Modification 3

Figure 15:
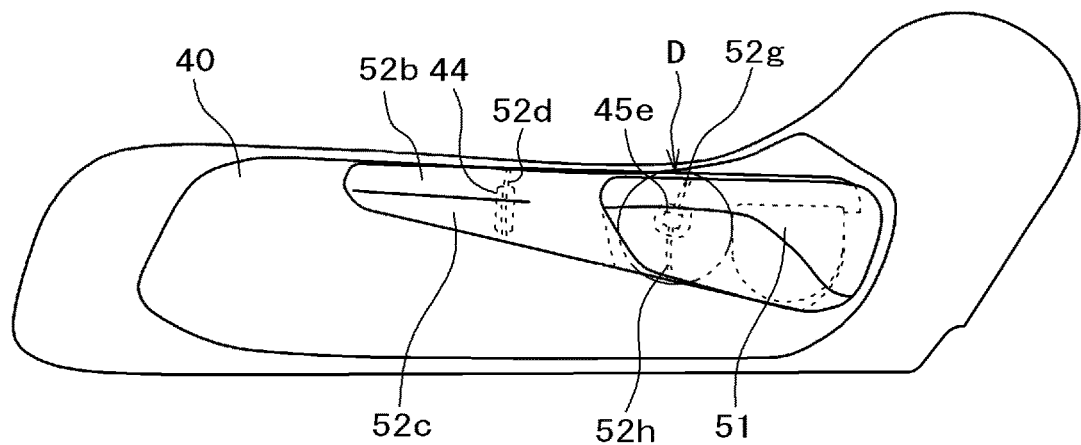
FIG. 15 is a side view of a side cover and a second operation lever in accordance with a modification 3.

A modification 3 differs in the configuration of the rearward boss and rib, which is described with reference to FIG. 15. FIG. 15 is a side view of the side cover, the first operation lever and the second operation lever in accordance with the modification 3, in which the initial state of the second operation lever is illustrated.

The rearward and the rearward rib (corresponding to the area shown by a two-dot chain line D in FIG. 15) in the modification 3 differs from the rearward boss and the rearward rib in the embodiment (corresponding to the area shown by a two-dot chain line D in FIG. 10), but the other components in the modification 3 are the same as those in the embodiment. The rearward boss includes a second boss 45e. the second boss 45e is located in front of the through hole 46 and the first boss 44 is located in front of the second boss 45e. The first boss 44 and the second boss 45e are located away from each other in the front-rear direction, so that the second boss 45e is located between the first boss 44 and the through hole 46 in the front-rear direction. The second boss 45e is located closer the mounting portion 52a than the second boss 45 of the embodiment, the third boss 45b of the modification 1 and the third boss 45d of the modification 2 are located.

The second boss 45e vertically extends along the circumference of a circle centered around the center of the through hole 46. The second boss 45e is formed in an arc shape centered around the center of the through hole 46. The length of the second boss 45e in the up-down direction is shorter than that of the first boss 44. The length (width) of the second boss 45e in the front-rear direction is approximately equal to the length in the up-down direction. the second boss 45e has a width greater than that of a second rib 52g and the third rib 52h which will be described later.

The second operation lever 52 has a first rib 52d, the second rib 52g and the third rib 52h formed thereon.

The second rib 52g and the third rib 52h are located near the second boss 45g of the side cover 40 which is forward of the mounting portion 52a. The first rib 52d is located is located near the first boss 44 of the side cover 40 which is forward of the second rib 52g and the third rib 52h. The second rib 52g and the third rib 52h are placed in proximity to each other and arranged end to end in the up-down direction.

The first rib 52d, the second rib 52g and the third rig 52h vertically extend along the circumference of a circle centered around the center of the mounting portion 52a. The first rib 52d, the second rib 52g and the third rig 52h are formed in an arc shape centered around the center of the mounting portion 52a.

The upper end of the third rib 52h is offset downward from the lower end of the second rib 52g, and the lower end of the second rib 52g is offset upward from the upper end of the third rib 52h. The lower end of the third rib 52h is situated near the lower side of the arm 52c, and the upper end of the second rib 52e is situated near the upper side of the arm 52c.

In the modification 3, the first rib 52d abuts on the first boss 44. The second rib 52g abuts on the second boss 45e. The third rib 52h abuts on the second boss 45e.

When the second operation lever 52 is at its initial position, the first rib 52d on the inner-side surface of the arm 52c abuts on the first boss 44 as in the case of FIG. 6A, the second rib 52g is away from the second boss 45e as in the case of FIG. 6B, and the third rib 52h is away from the second boss 45e as in the case of FIG. 6C. When the first rib 52d on the inner-side surface of the arm 52c abuts on the first boss 44, the inner-side surface of the arm 52c is away from the side of the side cover 40, so that a clearance exists between the inner-side surface of the arm 52c and the side of the side cover 40. When the second operation lever 52 is at its initial position, the first boss 44 and the second boss 45e are hidden behind the second operation lever 52.

As in the case of FIG. 12, when the side cover 40 and the second operation lever 52 are viewed from side, even in the second operation lever 52 pulled up to its highest position, the first rib 52d of the arm 52c of the second operation lever 52 does not abut on the first boss 44 and the second rib 52g does not abut on the second boss 45e, but the third rib 52h abuts on the second boss 45e.

As in the case of FIG. 13, when the side cover 40 and the second operation lever 52 are viewed from side, even in the second operation lever 52 pulled down to its lowest position, the first rib 52d of the arm 52c of the second operation lever 52 does not abut on the first boss 44 and the third rib 52h does not abut on the second boss 45e, but the second rib 52g abuts on the second boss 45e.

As long as the first rib 52d on the inner-side surface of the second operation lever 52 abuts on the first boss 44 or the second rib 52g abuts on the second boss 45e or the third rib 52h abuts on the second boss 45e, when the operator pulls up/down the second operation lever 52 as described above, the first rib 52d, the second rib 52g and the third rib 52h of the second operation lever 52 slide respectively on the first boss 44, the second boss 45e and the second boss 45e.

In the modification 3, there is also a range of switchover between the ribs abutting when the second operation lever 52 is operated (i.e., a range that the forward rib abuts on the first boss and the rearward rib abuts on the second boss) as in the case of the embodiment.

According to the above-described embodiment and modifications, the following advantageous effects are produced.

(1) Since the second operation lever 52 has the first rib 52d formed closer to the front end to abut on the first boss 44 of the side cover 40 and the distance from the first boss 44 to the front end is designed to be shorter, the front end can be restrained from making contact with the side cover 40 due to a side-to-side rocking motion with the first boss 44 acting as a fulcrum. As a result, when the second operation lever 52 is at its initial position, the second operation lever 52 can be restrained from coming into contact with the side cover 40 to make a sound or a scratch on the side cover 40.

(2) Since the first rib abuts on the first boss when the second operation lever 52 is within a predetermined range from the initial position of the second operational lever 52, a reduction/removal of the friction between the side cover 40 and the second operation lever 52 is made possible.

(3) Since the second operation lever 52 has the second rib or third rib formed closer to the rotation shaft to abut on the second boss of the side cover 40 and the distance from the second boss to the rotation shaft is designed to be shorter, the second rib or the third rib abuts on the second boss within the wide operational range of the second lever 52. This makes it possible to reduce/remove the friction between the side cover 40 and the second operation lever 52 when the second operation lever 52 is pulled up/down. Thus, a more smooth movement of the second operation lever 52 can be achieved.

(4) The upper ends of the second rib and the third rib are arranged in vertical offset positions. The lower ends of the second rib and the third rib are arranged in vertical offset positions. The range of the second rib formed in the up-down direction differs from the range of the third rib formed in the up-down direction. As a result, the second rib and the third rib are not caused to abut on the second boss in the predetermined range from the initial position of the second operation lever 52, and, in the upward movement and in the downward movement, the second rib or the third rib is able to abut on the second boss, so that a stable and smooth movement of the second operation lever 52 in a wide range can be achieved.

(5) Since the first boss and the second boss (as well as the third boss) are hidden behind the second operation lever 52 placed at its initial position, enhanced appearance and design appreciation of the side cover 40 can be achieved.

(6) Even when the second operation lever 52 is pulled up to its highest position, the third rib of the second operation lever 52 abuts on the boss. Because of this, the range in which the second operation lever 52 is brought out of contact with the side of the side cover 40 is able to be extended to the upper limit point (top dead center). Thus, a stable and smooth movement of the second operation lever 52 from the initial position, predetermined range to the upper limit point is achieved.

(7) Even when the second operation lever 52 is pulled down to its lowest position, the second rib of the second operation lever 52 abuts on the boss. Because of this, the range in which the second operation lever 52 is brought out of contact with the side of the side cover 40 is able to be extended to the lower limit point (bottom dead center). Thus, a stable and smooth movement of the second operation lever 52 from the initial position, predetermined range to the lower limit point can be achieved.

(8) A range in which the bosses are formed on the side cover is limited by design factors of the side cover. However, because of the above (2), (6) and (7), abutting of the rib on the boss is made possible throughout the operation range of the lifter operation lever.

Having described one embodiment in detail in accordance with the present invention made by the inventor, it should be apparent that the present invention is not limited to the above embodiment and various changes may be made.

For example, the side cover, the first operation lever and the second operation lever are placed on the left side of the seat cushion in the embodiment, but may be placed on the right side of the seat cushion.

Further, the first operation lever and the second operation lever are formed by use of resin in the embodiment, but may be formed by putting resin onto a sheet metal bracket.

Further, the modification 2 employs the two separated rearward ribs, the second rib 52e and the rear third rib 52f, which are offset in the front-rear direction, but a single long rib may be employed.

What is claimed is:

1. A vehicle seat, comprising:
   a seat cushion which is capable of being lifted and lowered;
   a seatback which is tiltable relative to the seat cushion;
   a side cover which covers a side of a rear portion of the seat cushion from a front portion of the seat cushion;
   a first operation lever which is placed on a lateral side of the side cover; and
   a second operation lever which is placed closer to the side cover than the first operation lever is placed,
   wherein
   the side cover includes:
      a first abut boss; and
      a second abut boss which is placed closer to a rotation center of the second operation lever than the first abut boss is placed,
   the second operation lever includes:
      a first abut rib;
      a second abut rib which is placed closer to a rotation center of the second operation lever than the first abut rib is placed; and
      a third abut rib which is placed closer to the rotation center of the second operation lever than the first abut rib is placed,
   the second operation lever overlaps the first operation lever in side view,
   the second operation lever has a length in a front-rear direction greater than that of the first operation lever, and
   the first abut boss is located at a longer distance from the rotation center of the second operation lever than a distance between a front end of the first operation lever and the rotation center of the second operation lever.

2. The vehicle seat according to claim 1, wherein
when the second operation lever is in an initial position, the first abut rib abuts on the first abut boss, and the second abut rib and the third abut rib do not abut on the second abut boss,
when the second operation lever is in a maximum pulled-up position, the first abut rib does not abut on the first abut boss, and either the second abut rib or the third abut rib abuts on the second abut boss, and
when the second operation lever is in a maximum pulled-down position, the first abut rib does not abut on the first abut boss, and either the second abut rib or the third abut rib abuts on the second abut boss.

3. The vehicle seat according to claim 2, wherein
the second operation lever operates in an operation range in which there is an overlap between a range in which the first abut rib abuts on the first abut boss and a range in which the third abut rib abuts on the second abut boss, and there is an overlap between a range in which the first abut rib abuts on the first abut boss and a range in which the second abut rib abuts on the second abut boss.

4. The vehicle seat according to claim 1, wherein
the first abut boss extends in an up-down direction,
the first abut rib extends in the up-down direction,
the first abut boss has a length in the up-down direction shorter than a length of the first abut rib in the up-down direction, and
the first abut boss has a width greater than a width of the first abut rib.

5. The vehicle seat according to claim 4, wherein
the second abut rib extends in the up-down direction,
the third abut rib extends in the up-down direction,
the second abut rib has an upper end offset from an upper end of the third abut rib in the up-down direction, and
the second abut rib has a lower end offset from a lower end of the third abut rib in the up-down direction.

6. The vehicle seat according to claim 5, wherein
the upper end of the second abut rib is located upward of the upper end of the third abut rib, and
the lower end of the second abut rib is located upward of the lower end of the third abut rib.

7. The vehicle seat according to claim 6, wherein
when the second operation lever is in a maximum pulled-up position, the third abut rib abuts on the second abut boss, and
when the second operation lever is in a maximum pulled-down position, the second abut rib abuts on the second abut boss.

8. The vehicle seat according to claim 7, wherein
the third abut rib is placed closer to the rotation center of the second operation lever than the second abut rib is placed.

9. The vehicle seat according to claim 8, wherein
the side cover further includes a third abut boss placed closer to the rotation center of the second operation lever than the second abut boss is placed,
when the second operation lever is in a maximum pulled-up position, the third abut rib abuts on the third abut boss, and
when the second operation lever is in a maximum pulled-down position, the second abut rib abuts on the second abut boss.

10. The vehicle seat according to claim 9, wherein
the third abut rib is placed closer to the rotation center of the second operation lever than the second abut rib is placed.

11. The vehicle seat according to claim 1, wherein
the first operation lever is a reclining operation lever used to adjust a tilt of the seatback, and
the second operation lever is a lifter operation lever used to adjust a height of the seat cushion.

* * * * *